United States Patent Office 3,525,770
Patented Aug. 25, 1970

3,525,770
AMINOBICYCLO[3.2.2]NONANES
Alfred W. Chow, Radnor, Pa., assignor to Smith Kline & French Laboratories, Philadelphia, Pa., a corporation of Pennsylvania
No Drawing. Original application Aug. 10, 1966, Ser. No. 571,430, now Patent No. 3,439,102, dated Apr. 15, 1969. Divided and this application Nov. 6, 1968, Ser. No. 773,943
Int. Cl. A61k 27/00; C07c 87/40
U.S. Cl. 260—563  8 Claims

ABSTRACT OF THE DISCLOSURE

Amino, aminomethyl, and α-aminoethylbicyclo[3.2.2]nonanes and their salt are prepared, formulated, and administered to animals to combat influenza infections.

This application is a divisional of copending application Ser. No. 571,430, filed Aug. 10, 1966, now U.S. Pat. No. 3,439,102, which is a continuation-in-part of application Ser. No. 507,057, filed Nov. 9, 1965, now abandoned.

This invention relates to aminobicyclo[3.2.2]nonanes having antiviral activity. In particular, the invention relates to bicyclo[3.2.2]nonanes substituted at the 1-, 2-, 3-, or 6-position with an amino or substituted amino group.

The chemical compounds of the invention are represented by the following structural formula:

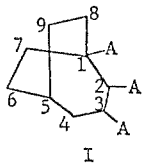

I where one A group is $NRR^1$ and the other A groups are hydrogen, and
R and $R^1$ are each hydrogen or lower alkyl.

Also included as part of the invention are the pharmaceutically acceptable acid addition salts of the compounds of Formula I.

The term "lower alkyl" when used to describe the compounds of the present invention is intended to represent those alkyl groups having 1 to about 8 carbon atoms therein. Among such groups are methyl, ethyl, propyl, and hexyl.

The invention also includes a method of ameliorating the effects of and a method of preventing viral infections by means of a compound of Formula I. In addition, the invention includes compounds of Formula II, or pharmaceutically acceptable acid addition salts thereof.

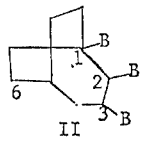

II where
one B group is

and the other B groups are hydrogen, and $R^2$ is hydrogen or methyl.

The compounds of Formula I are prepared in the following manner:

1-aminobicyclo[3.2.2]nonane is prepared by treating 1-chlorobicyclo[3.2.2]nonane [Helv. Chim. Acta, 41, 1191 (1958)] with lithium and the resulting compound carbonated with carbon dioxide to give the 1-carboxylic acid. The acid is then converted to the 1-amino compound by conventional methods including the Schmidt reaction (sodium azide and sulfuric acid) and the Curtius reaction (formation of the azide, transformation to the isocyanate, and hydrolysis to the amine).

The 2-amino compound is prepared by the Ritter reaction, i.e., treatment of 2-hydroxymethylbicyclo[2.2.2]octane [Chem. Ber. 88, 144 (1955)] with acetonitrile and sulfuric acid. The resulting 2-acetamidobicyclo[3.2.2]nonane is then hydrolyzed with acid to give the 2-amino compound.

The 3-amino compound is prepared by condensing cyclohepta-3,5-dienone [J. Org. Chem. 30, 2109 (1965)] with ethylene in a bomb to form the Diels-Alder Product III.

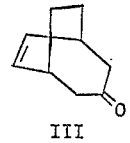

III

The double bond is reduced by catalytic hydrogenation, the ketone is converted to the oxime, and the oxime reduced to the 3-amine by catalytic hydrogenation or with lithium aluminum hydride.

The 6-amino compound is prepared by condensing cyclohepta-1,3-diene [Chem. Ber. 95, 2567 (1962)] with ethyl acrylate in a bomb to give the Diels-Alder Product IV. The double bond is reduced by catalytic hydrogenation, the ester

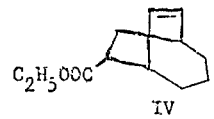

IV saponified with base, and the acid converted to the amine by means of the Schmidt or Curtius reactions.

The compound of Formula II where the B group at the 6-position is $CH_2NH_2$ and the other B groups are hydrogen is described in Chem. Ber. 89, 1972 (1956). The other compounds within the scope of Formula II are prepared by conventional methods. The compound where the B group at the 1-position is $CH_2NH_2$ is prepared from the carboxylic acid by conversion to the acid chloride, then to the amide, and finally by conventional reduction. The compound with the B group at the 2-position is $CH_2NH_2$ is prepared by oxidizing the 2-hydroxy compound to a 2-ketone, and running the Wittig reaction with methoxymethylene triphenylphosphorane to give ultimately the 2-carboxaldehyde. Reaction with hydroxylamine and reduction of the oxime gives the product. The 3—$CH_2NH_2$ compound is also prepared by this series of steps, starting with the 3-ketone.

The compounds where B is

are prepared as follows: The compound where the

group is at the 1-position are prepared by treating the carboxylic acid with methyl lithium, converting the resulting methyl ketone to the oxime with hydroxylamine, and reducing the oxime with lithium aluminum hydride. The

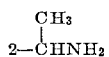

compound is prepared by oxidizing the 2-carboxaldehyde to the carboxylic acid with silver nitrate and converting the acid to the product as described above using the methyl lithium procedure. The

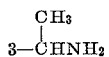

compound is prepared by converting the 3-ketone to the carboxylic acid by means of the Wittig procedure and silver nitrate oxidation, and then converting the acid to the product by the above-described procedure. The

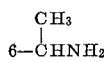

compound is prepared from the carboxylic acid in the same manner.

The compounds where the $$\begin{array}{c} CH_3 \\ | \\ CHNH_2 \end{array}$$

group is at the 1, 2, or 3 positions are considered part of the present invention.

The various primary amino compounds, prepared as described above, are readily converted into alkyl, dialkyl, or acyl derivatives by well-known procedures. A lower alkylamine is prepared by treatment of the amine with a lower alkyl halide or sulfate. An acylamine is prepared by treatment with an acyl halide or anhydride. An acylamine is also reduced to an alkylamine with lithium aluminum hydride. Dilower alkylamines are prepared by acylating an alkylamine, and then reducing the acylalkylamine with a reagent such as lithium aluminum hydride. A methylamino compound is prepared by reaction of methanol with a bicyclic isocyanate, followed by reduction of the resulting carbamate with lithium aluminum hydride.

The basic amine compounds of the invention may be converted to any of a variety of pharmaceutically acceptable acid addition salts by adding an acid, either as such or in the form of an alcoholic, ethereal, or acetone solution, to a solution of the basic compound. Among the pharmaceutically acceptable acids which may be used to form the salts are hydrochloric, which is preferred, sulfuric, hydrobromic, citric, pamoic, maleic, cyclohexylsulfamic, nitric, acetic, tartaric, and succinic.

Since certain of the carbon atoms in the claimed bicyclo[3.2.2]nonanes possess assymetric carbon atoms, it will be apparent that these compounds exist in the form of racemic mixtures. Inasmuch as separation of racemic mixtures by various methods is known to the art of organic chemistry, the present invention is intended to embrace the racemic mixtures as well as the separated optically active forms.

The antiviral compounds of the invention are particularly active against influenza viruses. The compounds of the invention are used and the methods of the invention are practiced by administering to a warm-blooded mammal, either before or immediately after infection has occurred, an effective amount of an antiviral compound. The compounds are active at a dose level of 1–100 mg./kg. of subject mammal per day. The compounds are best administered either orally in the form of tablets or capsules, or intranasally in the form of a nasal spray or nose drops. The free base or a pharmaceutically acceptable acid addition salt may be used. The compositions are formulated in a manner well-known to pharmaceutical chemists, utilizing standard pharmaceutical excipients such as lactose, starch, terra alba, magnesium stearate, calcium sulfate, glyceryl mono or distearate, gelatin, or wax. The oral compositions may contain 50–500 mg. of active compound. The nasal spray or nose drops can be a 2–10% preparation. The 2-amino and 6-amino compounds have been found to cause a 55–90% increase in the survival of mice infected with influenza $A_2$, Ann Arbor strain at subcutaneous dosages of 25–100 mg./kg. of test animal. The 6-aminomethyl compound has been found to cause a 45–95% increase in the survival in mice infected with influenza $A_2$ at oral and subcutaneous dosages of 1.56–25 mg./kg. and 42–75% in mice infected with influenza $A_1$, swine strain at oral and subcutaneous dosages of 6.25–25 mg./kg.

A tablet may have the following composition:

| | Mg. |
|---|---|
| 2-aminobicyclo[3.2.2]nonane hydrochloride | 100 |
| Magnesium stearate | 2.5 |
| Starch | 15 |
| Terra alba | 150 |
| Granulate with syrup or 5% gelatin solution terra alba | Q.s. ad 300 |

A nasal solution may have the following composition:

| | | |
|---|---|---|
| 6-aminomethylbicyclo[3.2.2]nonane hydrochloride | percent w./v. | [1] 7.45 |
| Eucalyptol, N.F. | v./v. | 0.020 |
| Saccharin sodium | percent w./v. | 0.050 |
| Thimerosal, N.F. | percent w./v. | 0.001 |
| Potassium biphthalate | percent w./v. | 0.130 |
| Sodium citrate | percent w./v. | 0.200 |
| Purified water | Q.s. ad, percent w./v. | 100.000 |

[1] Equivalent to 5% base.

A capsule may have the following composition:

| | Mg. |
|---|---|
| 2-aminobicyclo[3.2.2]nonane hydrochloride | 200 |
| Lactose, starch, or terra alba | 200 |

The following examples are intended to illustrate the preparation of the compounds of the invention. Various minor modifications in the compounds and in the processes for preparing them which occur to one skilled in the art of synthetic organic chemistry are intended to be part of the present invention.

EXAMPLE 1

1-aminobicyclo[3.2.2]nonane

Lithium wire (4.8 g., 0.7 mole) is placed under 50 ml. of mineral oil, the system is purged with dry nitrogen, and powdered under anhydrous conditions. The mineral oil is removed under nitrogen and the lithium sand is washed and then replaced with 50 ml. of dry cyclohexane. One-half of a solution of 15.8 g. (0.1 mole) of 1-chlorobicyclo[3.2.2]nonane in 50 ml. dry cyclohexane is added and the mixture, while being stirred, is heated to 90°. An exothermic reaction starts and this is maintained by the addition of the other half of the solution of the halide. The suspension is heated for 1 hour at reflux under a positive nitrogen pressure, then cooled, and 100 ml. of dry pentane added. Carbon dioxide (dried) is passed into the stirred suspension for two hours. The excess lithium is destroyed by addition of alcohol and then water. Following the addition of 150 ml. of ether, the aqueous phase is acidified with hydrochloric acid and the solid which precipitates is extracted with ether. The ethereal extract is evaporated to give the crude 1-carboxylic acid. Sublimation in vacuo gives the purified acid.

To a solution of 7.2 g. (0.043 mole) of the acid in 100 ml. of chloroform is added 60 ml. of concentrated sulfuric acid, followed by 12 g. (0.060 mole) of sodium azide in small portions. The reaction mixture is heated at 55° for 6 hours and poured onto ice. After removal of chloroform in vacuo, the residual liquid is made basic with 10% sodium hydroxide and extracted with ether. The ethereal extract is dried and evaporated to give the title amine. An ethereal solution of the amine is treated with ethereal hydrogen chloride to give the amine hydrochloride.

EXAMPLE 2

2-aminobicyclo[3.2.2]nonane

Acetonitrile (0.97 g., 0.0235 mole) is charged into the reaction flask and cooled to 10°. Conc. sulfuric acid (6.3 g., 0.0642 mole) is added dropwise with stirring at the same temperature. To the resulting clear, cooled solution is added dropwise 3.0 g. (0.0214 mole) of 2-hydroxymethylbicyclo[2.2.2]octane. The reaction mixture is allowed to reach room temperature and is stirred for 3 hours. The reaction mixture is poured over 43.6 ml. of 10% sodium hydroxide containing ice. The white, oily solid which forms is extracted with benzene and ether. The extracts are dried, the solvent stripped under vacuum to give a light yellow oil, and the oil is distilled at 135°/0.75 mm. to give 2-acetamidobicyclo[3.2.2]nonane.

The amide (2.3 g., 0.0127 mole) is refluxed overnight in 23.0 ml. of conc. hydrochloric acid with stirring under nitrogen. Upon cooling, a white solid comes out of solution, M.P. 255° dec. Recrystallization from acetonitrile gives the hydrochloride salt of the title amine, M.P. 303° dec. The free base is obtained by dissolving the salt in water, making the solution basic, extracting with ether, and drying and evaporating the solvent.

EXAMPLE 3

3-aminobicyclo[3.2.2]nonane

Cyclohepta-3,5-dienone (8.0 g., 0.074 mole) is reacted with ethylene in a bomb at 170° for 24 hours. The reaction mixture is evaporated to give crude bicyclo[3.2.2]non-6-en-3-one.

The crude olefin (5.9 g., 0.044 mole) is hydrogenated over 0.5 g. of platinum oxide in hexane on a Parr shaker for one hour. Filtration and concentration of the filtrate gives the crude bicyclo[3.2.2]nonan-3-one [J. Am. Chem. Soc. 87, 2183 (1965); Chem. Ber. 91, 1525 (1958)].

A solution of 7.5 g. of hydroxylamine hydrochloride, 30 ml. of water, and 30 ml. of 10% sodium hydroxide is adjusted to pH 6.5–7.0. To this solution is added a solution of the above ketone (3.0 g., 0.022 mole) dissolved in 10 ml. of 95% alcohol. The mixture is heated to 70° and kept at this temperature for 0.5 hour. The reaction mixture is cooled and extracted with several portions of ether. The ethereal extract is dried and evaporated in vacuo to give the oxime as an oil.

The oxime (1.53 g., 0.01 mole) is taken up in 150 ml. of methanol to which a small amount of ethereal hydrogen chloride has been added. This solution is hydrogenated over 0.5 g. of platinum oxide at 60° and 60 p.s.i. for 16 hours.

The reaction mixture is filtered and the filtrate concentrated to give the title amine hydrochloride. The free base is obtained in conventional manner as described above.

EXAMPLE 4

6-aminobicyclo[3.2.2]nonane

A mixture of 7.0 g. (0.075 mole) of cyclohepta-1,3-diene and 9.4 g. (0.094 mole) of ethyl acrylate are reacted in a bomb at 170° for 45 hours. The product is distilled at 144–145°/27–28 mm. to give ethyl bicyclo[3.2.2]non-8-ene-6-carboxylate.

3.0 grams (0.0154 mole) of ethyl bicyclo[3.2.2]non-8-ene-6-carboxylate is hydrogenated on a Parr shaker over 0.3 g. of platinum oxide in hexane for 3 hours. The saturated nonane product is distilled at 127–144°/29 mm.

Ethyl bicyclo[3.2.2]nonane-6-carboxylate (2.0 g., 0.01 mole) is hydrolyzed with 4.0 g. of potassium hydroxide in methanol under reflux for 3½ hours. The acid is purified by reprecipitation, M.P. 117° dec.

A mixture of 1.1 g. (0.0063 mole) of bicyclo[3.2.2]nonane-6-carboxylic acid, 15 ml. of reagent chloroform, and 6.4 ml. of conc. sulfuric acid are stirred for a short period. 4.65 grams (0.0071 mole) of sodium azide is added over a 25 minute period. The reaction mixture is stirred at 56–58° for 5½ hours. Ice is added and the chloroform is stripped under vacuum. The aqueous phase is made alkaline and extracted with ether. After being dried, the ether solution of the title amine is acidified with ethereal hydrogen chloride. White solid is formed. The hydrochloride salt recrystallized from methanol-ether, M.P. 280° dec.

EXAMPLE 5

2-dimethylaminobicyclo[3.2.2]nonane 2-aminobicyclo[3.2.2]nonane (1.5 g.) is mixed with 0.5 mole of 90% formic acid and 0.22 mole of 35% formaldehyde solution. The mixture is heated for 12 hours on the steam bath, 50 ml. of conc. hydrochloric acid is then added, and the mixture evaporated to dryness in vacuo. To the residue is added 200 ml. of 1 N sodium hydroxide. The product is obtained by extraction with ether and drying and evaporating the ether. The pure product is obtained by distillation or by conversion from a previously purified hydrochloride salt.

EXAMPLE 6

6-methylaminobicyclo[3.2.2]nonane

Bicyclo[3.2.2]nonane-6-carboxylic acid (Example 4, 6.47 g., .0385 mole) is stirred with 90 ml. of thionyl chloride at room temperature under a calcium chloride tube for 16 hours. The thionyl chloride is stripped off in vacuo, azeotroping the last traces with benzene. The acid chloride is dissolved in 300 ml. of acetone and chilled in an ice-salt bath to 0–5°. A solution of 2.9 g. (.044 mole) of sodium azide in 29 ml. of water is added slowly to the stirred solution of acid chloride. The cloudy orange mixture is stirred at 5° for 15 minutes and then poured into 400 ml. of ice water. The mixture is extracted with a total of 500 ml. of toluene, washed several times with a total of 400 ml. of water, dried over magnesium sulfate, and filtered. The clear yellow solution of the acid azide is heated on a steam bath for an hour and then refluxed for 1 hour. The toluene is evaporated to give the 6-isocyanate.

The isocyanate (3.23 g.) is dissolved in 60 ml. of methanol and the solution is then refluxed for 2 hours. The solvent is evaporated in vacuo, 50 ml. of dry tetrahydrofuran is added to the resulting carbamate, and the mixture is refluxed with 0.76 g. of lithium aluminum hydride for four hours. The reaction mixture is decomposed with water and filtered, and the filtrate evaporated to give the title methylamino product. The pure product is obtained either by distillation or by conversion from a previously recrystallized hydrochloride salt.

EXAMPLE 7

3-acetamidobicyclo[3.2.2]nonane 3-aminobicyclo[3.2.2]nonane (2.73 g.) is allowed to stand overnight with 5 g. of acetic anhydride in 100 ml. of pyridine. The reaction mixture is then diluted with ice water and the amide product removed by filtration or extracted with a solvent such as ether or chloroform. Recrystallization yields the pure product.

EXAMPLE 8

3-(N-ethylacetamido)bicyclo[3.2.2]nonane

A solution of 1.81 g. of the amide of Example 7 in 50 ml. of dry tetrahydrofuran is refluxed for 2 hours with 0.45 g. of 53.5% sodium hydride. A solution of 1.56 g. of ethyl iodide in 25 ml. of dry tetrahydrofuran is added to the cooled reaction mixture which is then refluxed for twelve hours. A small amount of water is cautiously added wth cooling, the solution is filtered, and most of the tetrahydrofuran evaporated in vacuo. A further quantity of water is added, the alkaline solution is extracted with ether, and the extracts dried and evaporated to give the title product.

EXAMPLE 9
3-diethylaminobicyclo[3.2.2]nonane

A solution of 2.09 g. of the N-ethylacetamido compound of Example 8 in 100 ml. of dry tetrahydrofuran is refluxed with 0.5 g. of lithium aluminum hydride for 12 hours. The excess hydride is decomposed by the cautious addition of water, with cooling. The solution is filtered, the filtrate extracted with ether, and the ether extracts evaporated to give the diethylamino product. Reduction of the 3-acetamido product of Example 7 in the same manner gives the 3-ethylamino compound.

EXAMPLE 10
1-propylaminobicyclo[3.2.2]nonane

To a stirred solution of 250 ml. of absolute alcohol, 25 g. of sodium bicarbonate, and 17.6 g. of 1-aminobicyclo [3.2.2]nonane hydrochloride is added 17.0 g. of propyl iodide. The mixture is warmed and maintained at a temperature sufficient to cause the evolution of carbon dioxide until the gas evolution ceases. The mixture is cooled and filtered, and the solvent evaporated. Sodium hydroxide (10%) is added to the residue, and the basic mixture extracted with ether. The ether extracts are dried and evaporated to give an oil which is distilled to give the title product.

EXAMPLE 11
1-aminomethylbicyclo[3.2.2]nonane

A solution of 5.04 g. (.03 mole) of bicyclo[3.2.2] nonane-1-carboxylic acid in 25 ml. of thionyl chloride is refluxed for 2 hours and then allowed to stand overnight at room temperature. The excess thionyl chloride is evaporated in vacuo, the residual oil is taken up in benzene, and the solution further evaporated to give the acid chloride.

This acid chloride is dissolved in 15 ml. of dry tetrahydrofuran and the solution added dropwise to an icecold solution of conc. aqueous ammonia (ca. 75 ml.). After stirring for 1 hour, water is added, and the amide either removed by filtration or extracted with an organic solvent.

To a slurry of 3.04 g. of lithium aluminum hydride in 400 ml. of refluxing tetrahydrofuran is added in portions, over 1 hour, 3.34 g. of this amide, all under nitrogen. The mixture is heated at reflux for 24–48 hours, cooled, and the excess hydride decomposed by the cautious addition of water. The resulting white slurry is filtered, the filter cake washed with ether, and the filtrates combined and evaporated in vacuo to give the title aminomethyl product.

EXAMPLE 12
2-aminomethylbicyclo[3.2.2]nonane

To a solution of 4.06 g. (0.029 mole) of 2-hydroxybicyclo[3.2.2]nonane in 50 ml. of acetic acid is added dropwise over a period of time 3.2 g. (0.032 mole) of chromic anhydride in 2.5 ml. of water and 50 ml. of acetic anhydride, with cooling. The mixture is stirred 4 hours at room temperature, poured into water, and extracted with pentane. The pentane extracts are washed, dried, and evaporated to give bicyclo[3.2.2]nonane-2-one.

A stirred suspension of 20 g. (0.0584 mole) of methoxymethyl triphenylphosphonium chloride in 100 ml. of tetrahydrofuran and 100 ml. of diglyme is treated dropwise with 52.5 ml. (.05 mole) of ethereal n-butyl lithium in a nitrogen atmosphere, and the mixture allowed to stir for 3 hours at 25°. To the resulting deep red solution is added dropwise a solution of 3.45 g. (0.025 mole) of bicyclo[3.2.2]nonane-2-one in 20 ml. each of tetrahydrofuran and diglyme. After stirring for 4 hours at 25°, the tetrahydrofuran is removed by heating on the steam bath, 100 ml. of diglyme is added, and the mixture is refluxed for 7 hours. The mixture is cooled, concentrated to one-half volume in vacuo, and treated with methyl bromoacetate to remove any triphenylphosphine. After standing 12 hours, the solid is filtered off, the filtrate washed with water, and the dried organic layer evaporated to give an oil. Column chromatography over alumina gives the 2-methoxymethylene compound.

This vinyl ether is allowed to stand for 15 minutes at room temperature in a saturated solution of ether in perchloric acid, poured into aqueous sodium bicarbonate and extracted with ether. Evaporation of the dried ether extracts gives the 2-carboxaldehyde.

To a solution of 9.38 g. of hydroxylamine hydrochloride in 40 ml. of water and 40 ml. of 10% aqueous sodium hydroxide is added a solution of 4.15 g. of the 2-aldehyde in 50 ml. of 95% alcohol. The mixture is heated at 70–80° for 15 minutes, filtered hot, and then diluted with 175 ml. of cold water. The precipitate is collected and dried to give the 2-aldehyde oxime.

To a slurry of 1.75 g. of lithium aluminum hydride in 150 ml. of refluxing tetrahydrofuran is added over 20 minutes a solution of 3.55 g. of the oxime in 75 ml. of tetrahydrofuran. The mixture is heated at reflux for 3 hours, cooled, and the excess hydride decomposed by cautious addition of water. The resulting white slurry is filtered, the filter cake washed with ether, and the combined filtrates dried and evaporated to give the title 2-aminomethylbicyclo[3.2.2]nonane. The 3-aminomethyl compound is prepared in the same manner from the 3-ketone.

EXAMPLE 13
1-($\alpha$-aminoethyl)bicyclo[3.2.2]nonane

Bicyclo[3.2.2]nonane-1-carboxylic acid (4.95 g., 0.0295 mole) is dissolved in 100 ml. of dry tetrahydrofuran and, with stirring under nitrogen, 31 ml. (0.062 mole) of 2 N methyl lithium in ether is added over 3 to 4 minutes. The mixture is refluxed overnight and cooled to room temperature. Water (25 ml.) is added, and the product extracted with ether. After drying over magnesium sulfate, the ether is removed to yield bicyclo[3.2.2]non-1-yl methyl ketone.

To a mixture of 5.8 g. of this ketone, 3.22 g. (0.0463 mole) of hydroxylamine hydrochloride, and 15 ml. of ethanol are added, portionwise with stirring, 3 ml. of water and 5.9 g. (0.147 mole) of powdered sodium hydroxide. The reaction mixture is stirred and refluxed for 15 minutes and then poured into an ice cold solution of 20 ml. (0.240 mole) of concentrated hydrochloric acid in 110 ml. of water. The colorless solid is filtered and washed with water. After drying over phosphorus pentoxide, the oxime of the ketone is obtained.

A solution of 3.85 g. of the oxime in 50 ml. of tetrahydrofuran is added to a stirred suspension of 2.93 g. (0.077 mole) of lithium aluminum hydride in 75 ml. of ether. The mixture is stirred and refluxed overnight. After cooling to room temperature, 7 ml. (7.0 g., 0.389 mole) of water is added dropwise, and the mixture is stirred 1 hour at room temperature. The solid is filtered and washed well with ether. The ether is dried with solid potassium hydroxide and then with magnesium sulfate, and the product $\alpha$-aminoethyl compound obtained by removal of the ether. The hydrochloride salt is obtained by bubbling dry hydrogen chloride into an ether solution of the product amine until precipitation is complete, and then purifying by recrystallization.

EXAMPLE 14
2-($\alpha$-aminoethyl)bicyclo[3.2.2]nonane

To a solution of 2.74 g. of bicyclo[3.2.2]nonane-2-carboxaldehyde and 11.32 g. of silver nitrate in a mixture of 45 ml. of water and 35 ml. of absolute ethanol is added, dropwise with stirring over a 2 hour period, a solution of 4.2 g. of sodium hydroxide in 75 ml. of water. The resulting mixture is stirred overnight, filtered, extracted with ether, acidified, and again extracted with ether. Drying and evaporation of the ether gives the 2-carboxylic acid. This acid is converted to the title product by procedures described in Example 13.

3-(α-aminoethyl)bicyclo[3.2.2]nonane is prepared by converting bicyclo[3.2.2]nonan-3-one to the 3-carboxaldehyde by procedures described in Example 12, and then converting the aldehyde to the product as described in Examples 14 and 13.

6-(α-aminoethyl)bicyclo[3.2.2]nonane is prepared from the 6-carboxylic acid by procedures described in Example 13.

I claim:

1. A compound represented by one of the following formulas:

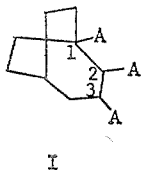 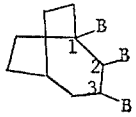

I          II where one A group is NRR¹ and the other A groups are hydrogen; and R and R¹ are hydrogen or lower alkyl; and one B group is

and the other B groups are hydrogen, and R² is hydrogen or methyl;

or a pharmaceutically acceptable acid addition salt thereof.

2. A compound as claimed in claim 1, represented by Formula I.

3. A compound as claimed in claim 1, represented by Formula II.

4. 2-aminobicyclo[3.2.2]nonane.
5. 3-aminobicyclo[3.2.2]nonane.
6. 2-aminomethylbicyclo[3.2.2]nonane.
7. 2-(α-aminoethyl)bicyclo[3.2.2]nonane.
8. 3-aminomethylbicyclo[3.2.2]nonane.

References Cited

UNITED STATES PATENTS 3,347,919   10/1967   Martin _____ 260—563

CHARLES B. PARKER, Primary Examiner

D. R. PHILLIPS, Assistant Examiner

U.S. Cl. X.R.

260—349, 453, 468, 501.1, 501.21, 514, 544, 561, 566, 586, 598, 611; 424—315, 317, 325